March 17, 1970 M. E. BUECHEL 3,501,671
TELEVISION CIRCUIT
Filed Aug. 29, 1966

INVENTOR
MEL. E. BUECHEL
BY
Mueller, Aichele & Rauner
ATTYS.

United States Patent Office 3,501,671
Patented Mar. 17, 1970

3,501,671
TELEVISION CIRCUIT

Mel E. Buechel, Chicago, Ill., assignor to Motorola, Inc., Franklin Park, Ill., a corporation of Illinois Filed Aug. 29, 1966, Ser. No. 575,796
Int. Cl. H01j 29/74
U.S. Cl. 315—27 6 Claims This invention relates in general to a pulse control circuit for widening available pulses and in particular to its use in a television receiver deflection system.

Figures 1, 2:
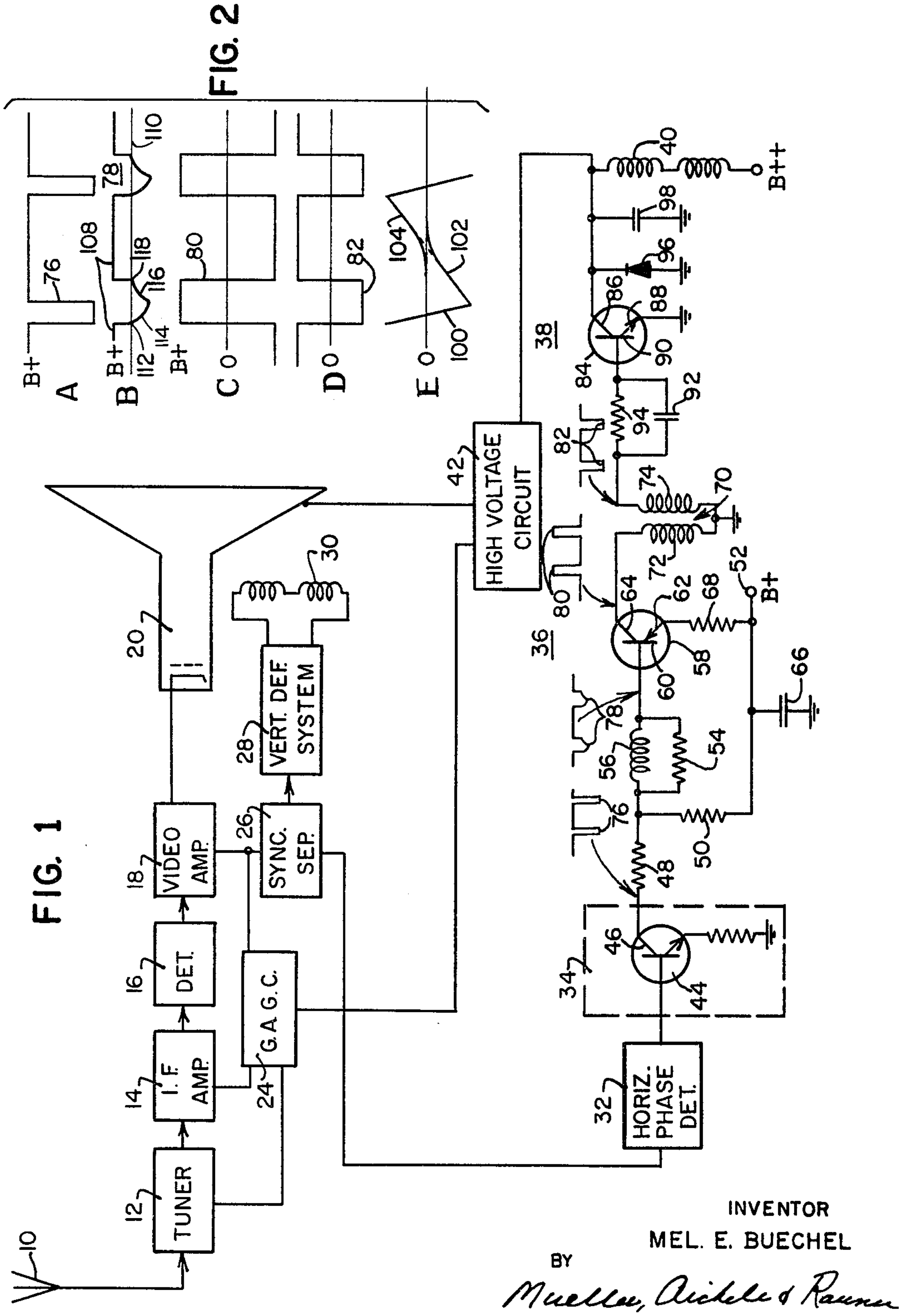

In present day television receivers, an electron beam is continuously deflected across the face of a cathode ray tube to scan all of the elements in the televised picture. The scanning is accomplished by utilizing vertical and horizontal deflection signals in the receiver synchronized with corresponding signals in the transmitter. The beam alternately traces and retraces the raster horizontally until a field is completed after which the beam retraces vertically in preparation to scan a second field, the combination of these two fields being a reproduction of the image transmitted. During trace, the output stage in the horizontal deflection system conducts so that an increasing current flows through the yoke to move the beam from left to right across the raster. During retrace, a pulse developed by a controlling oscillator cuts off the horizontal output stage so that the yoke current falls quickly to rapidly return the electron beam to the left hand side of the raster in preparation to scan the next line. A damper diode removes oscillations that would occur at the completion of retrace. Since the damper diode conducts the yoke current during the first part of the trace portion, the horizontal output stage need not be turned on precisely at the end of retrace but instead may be turned on any time thereafter as long as it is done before the damper current reaches zero. In this manner it is assured that trace will not begin until retrace is completed without requiring a highly accurate turn on time of the horizontal output stage.

In prior art deflection systems, the storage times of older type transistors used in the horizontal driver circuit inherently provided pulses longer in duration than those developed by the horizontal oscillator to maintain the output stage off for a portion of trace. However, modern day silicon transistors provide little storage time so that without additional means the pulse available from the driver circuit is of insufficient width to maintain the horizontal output stage cutoff for the required interval. It is inherent that some horizontal oscillator circuits develop relatively narrow pulses so that AFC (automatic frequency control) is readily accomplished and so that the pulse frequency is more stable with changes in temperature and bias supply potential.

When an arc of the cathode ray tube high voltage supply disrupts normal operation to effectively place a heavy load across the deflection system, lower peak currents flow when the horizontal output stage is off for part of trace than when it is on for the entire trace interval, so that the horizontal output stage is taxed to a lesser extent in its power capabilities.

Accordingly, it is an object of this invention to provide a horizontal drive circuit responsive to relatively short duration pulses for developing pulses of necessary duration and desirably fast rise time.

It is another object to develop horizontal control pulses having a fast enough rise time to effect rapid cutoff of the horizontal output stage upon the commencement of retrace and at the same time having a long enough duration to maintain the stage cutoff for at least the retrace time interval.

It is another object to lengthen the duration of available pulses so that a horizontal oscillator which provides relatively short duration, high stability pulses may be utilized.

It is another object to limit the amplitude of peak currents flowing in the horizontal output stage when an arc causes a heavy load to appear across the deflection system.

In the drawings:

FIG. 1 is a diagram of a transistorized television receiver partially in block form and partially in schematic form illustrating the invention; and FIG. 2 is a series of waveforms useful in explaining the operation of the invention.

In brief, a specific embodiment comprises a deflection system in a television receiver which develops a deflection signal for sweeping a cathode ray beam having trace and retrace portions. Included in the deflection system are an oscillator circuit for developing a series of pulses of a given duration, a pulse utilization device comprising a transistor adapted to be switched between cutoff and saturation for control of the cathode ray beam scan, and a pulse control circuit including an inductor connecting the oscillator circuit to the pulse utilization device. During the absence of pulses, the transistor is cutoff so that the base-to-emitter resistance is relatively large. When a pulse is generated by the oscillator circuit the voltage on the base builds up according to an $L/R$ time constant, R including the base-to-emitter resistance. Since R is large the transistor is driven into saturation without appreciable delay so that the transistor is in the proper conductive state at the precise time retrace is to commence. As soon as the transistor becomes saturated its base-to-emitter resistance becomes relatively small so that the voltage increases according to a much longer $L/R$ time constant. During the presence of the pulse, energy is being stored in the inductor so that when the pulse is removed, the base voltage starts to decrease but since the $L/R$ time constant is still relatively long, the voltage remains of sufficient amplitude to keep the transistor in saturation for a predetermined period after the completion of retrace.

Referring now to the drawings, the television receiver therein shown includes tuner 12 to receiver and frequency convert incoming television signals appearing at antenna 10. The output intermediate frequency signal developed by tuner 12 is coupled through IF amplifier 14 to detector 16 which develops a demodulated composite video signal having video components, and synchronizing components. The video components are amplified by video amplifier 18 and applied to the cathode of cathode ray tube 20. The video signal is coupled to gated AGC circuit 24 wherein a control potential indicative of the strength at the received television signal is developed. The control potential is applied to the amplifying devices in tuner 12 and IF amplifier 14 for the gain regulation thereof.

Video amplifier 18 is also coupled to sync separator 26 which separates the synchronizing signal components from the composite video signal. The vertical synchronizing components are applied to the vertical deflection system 28 which develops and applies a sawtooth wave current signal to the magnetic deflection yoke 30 disposed on the neck of cathode ray tube 20 for vertical scanning. The horizontal components are applied to the horizontal deflection system comprising horizontal phase detector 32, oscillator circuit 34, driver stage 36 and output stage 38. Yoke 40, disposed on the neck of cathode ray tube 20, is responsive to the signal developed by the deflection system to produce a sawtooth scanning current therethrough for horizontal deflection. High voltage circuit 42, coupled to output stage 38, develops the anode voltage for cathode ray tube 20 and the gating pulses for gated AGC circuit 24.

Considering now the operation of the horizontal deflection system, phase detector 32 is responsive to the horizontal components from sync separator 26 to develop a DC potential for controlling the frequency of pulses prodused by horizontal oscillator circuit 34. The load for oscillator transistor 44 comprises resistors 48 and 50 connected in series between collector 46 and DC energy source 52. The junction of these resistors is direct current connected through the parallel combination of resistor 54 and inductor 56 to base 60 of horizontal driver transistor 58. DC energy source 52, bypassed by capacitor 66, provides bias for the transistor through a relatively small degeneration resistor 68 to emitter 62 and through resistor 50 and inductor 56 to base 60. The load for collector 64 is the primary winding 72 of transformer 70. Pulses 76 on collector 46 of oscillator transistor 44 are attenuated by the voltage divider action of resistors 48 and 50 and are applied to inductor 56 which, together with other elements to be described, lengthens the pulse width and changes its appearance so that pulses labeled 78 are present at base 60. Pulses 78 alternately switch the conductive states of transistor 58 so that pulses 80 are produced on collector 64. The operation of the pulse control circuit including inductor 56 and the base-to-emitter resistance of transistor 58 in causing pulses 80 to be longer in duration than pulses 76 will be explained hereinafter. It will first be shown why these extended duration pulses are desirable.

The horizontal output circuit 38 includes a transistor 84 having an emitter 88 connected to ground. The parallel combination of resistor 94 and capacitor 92 couples secondary winding 74 to base 90 and provides additional base-emitter reverse bias for the transistor. Collector 86 is connected to horizontal deflection yoke 40 to provide a load for transistor 84. Damper diode 96 and capacitor 98 are connected from collector 86 to ground. Horizontal output circuit 38 provides a sawtooth current waveform at 15.75 kc. in yoke 40 for line deflection of the beam in cathode ray tube 20. Between pulses 82 transistor 84 is saturated so that a generally linearly increasing current is allowed to flow through yoke 40 to sweep the beam from left to right across the raster. As the current reaches a maximum, a negative-going pulse 82 is applied to base 90 causing abrupt cutoff of transistor 84. At this time, energy stored in yoke 40 is released and the current is permitted to oscillate at a frequency determined by the combined inductance of yoke 40 and a transformer (not shown) in high voltage circuit 42 and the capacity of capacitor 98. The circuit is permitted to oscillate for half a cycle which is usually 10 to 13 microseconds during which time the beam rapidly returns to the left hand side of the raster. Reference is made to FIG. 2E which illustrates the sawtooth current flowing through yoke 40 with portion 100 representing the half cycle of oscillation. Ringing or continued oscillation is undesirable and is eliminated by damper diode 96 which begins to conduct during the second half of the ringing waveform. Damper diode 96 remains conductive after the termination of retrace and the commencement of deflection producing current flow in yoke 40. The conduction of diode 96 is linear for only a part of the 54 microsecond trace interval. This is represented by portion 102 and is utilized to provide the initial part of trace. The duration of pulse 82 is such that transistor 84 is cutoff at the beginning of retrace and does not turn on again until sometime between the termination of retrace and the point at which damper diode 96 "runs out of conduction." When transistor 84 does turn on at the termination of pulse 82, the current through yoke 40 again begins to linearly increase as represented by portion 104.

It is desirable from two standpoints that transistor 84 not be turned on precisely at the end of retrace. First, if an arc from the cathode ray tube 20 occurs, the equivalent of a heavy load is placed across horizontal output circuit 38. If transistor 84 were turned on immediately upon the termination of retrace, current would be allowed to increase from the beginning of trace to the end of trace. However, if transistor 84 is not turned on until sometime after retrace, it would conduct only during the latter part of trace so that the current through transistor 84 would not be allowed to build up as high. In other words, when conduction occurs only during a part of trace, one need not choose a transistor of high current capabilities. Secondly, it will be noted that the time at which portion 104 commences is not critical as long as it is before damper diode 96 runs out of conduction; that is, before the end of portion 102. However, it is important that portion 104 does not commence before retrace ends. For these two reasons it is desirable that transistor 84 be cutoff from the beginning of portion 100 to sometime during portion 102. Rather than change the horizontal oscillator characteristic to produce wider pulses and thereby decrease stability and degrade AFC control, a pulse control circuit is employed to maintain transistor 84 cutoff for the desired interval.

To explain the operation of the pulse control circuit including inductor 56 and the base-to-emitter resistance of transistor 58, reference is made to FIG. 2 in which the waveforms therein illustrated are enlarged versions of corresponding waveforms shown at various points in the circuit of FIG. 1 and are placed above one another so as to facilitate comparison at any instant of time. FIGURES 2A, 2B, 2C and 2D respectively represent the waveforms on; collector 46 of horizontal oscillator transistor 44, base 60 of horizontal driver transistor 58, collector 64, and secondary 74 of transformer 70. FIG. 2E represents the current through yoke 40 as explained previously. The voltage characteristic on base 60 shown by waveform 78 depends on the $L/R_T$ time constant, L being inductor 56 and $R_T$ comprising resistors 48, 50 and 68, the collector-to-emitter resistance of transistor 44 and the base-to-emitter resistance of transistor 58. Between pulses 76 on collector 46, transistor 58 is cutoff, its base 60 is at B+ as shown by portions labeled 108 and its base-to-emitter resistance is large so that $R_T$ is relatively large. Thus, when pulse 76 appears, the base voltage builds up to level 110 very fast with a rise time corresponding essentially to the steep rise time of pulse 76. Level 110 represents the voltage at which transistor 58 changes conductive states. Since transistor 58 is a PNP conductivity type in this embodiment, when a pulse 76 appears to drive the base less positive than level 110, transistor 58 will be driven into saturation so that the base-to-emitter resistance decreases sharply to thereby decrease $R_T$ and increase the $L/R_T$ time constant. The base voltage continues to increase, although at a much slower exponential rate as shown by portion 114 until pulse 76 is moved. Since the base-to-emitter resistance is still relatively small, upon said removal the voltage decays exponentially at a rather slow rate as shown by portion 116 because of the increased $L/R_T$ time constant. When level 110 is reached transistor 58 is again cutoff so that $R_T$ increases and the voltage rapidly returns to B+. The base voltage charactesistic is such as to maintain transistor 58 in saturation from point 112 to point 118 and since the duration of pulses developed on collector 64 is equal to the interval that transistor 58 is in saturation, pulses 80 are longer in duration than pulses 76. Transformer 70 is poled in a manner such that pulse 80 is reversed in polarity to produce pulse 82 at secondary winding 74 for controlling the operation of horizontal output circuit 38 as discussed hereinbefore.

Since inductor 56 has a natural resonant frequency due to distributed capacity thereacross, oscillations may be developed when the voltage of pulse 78 falls to amplitude 110 at point 118. Resistor 54 is connected in parallel with the inductor to damp these oscillations.

What has been described, therefore, is a pulse control circuit responsive to relatively short duration oscillator pulses for developing longer duration pulses to maintain the horizontal output stage cutoff for a period of time exceeding the retrace interval. This is accomplished without sacrificing the requirement that the stage be turned off precisely at the commencement of retrace by causing these longer duration pulses to have rise times not appreciably different than the rise times of the oscillator pulses.

Although this invention has been described for one particular embodiment, it may be changed in ways obvious to those skilled in the art and still be within the spirit and scope of the following claims.

What is claimed is:

1. A pulse control circuit including the combination of: an oscillator circuit having output resistance means for developing a series of first pulses of a given duration, a pulse utilization device having input resistance means adapted to be switched between different conductive states, inductance means coupling said oscillator circuit to said pulse utilization device cooperating with said input and output resistance means to develop second pulses of a longer duration, a predetermined amplitude of said second pulses driving said pulse utilization device into one of said conductive states, said inductance means, said output resistance means and said input resistance means forming a time constant network, the value of said inductance means being selected so that in combination with said output resistance means and said input resistance means the rise time of each of said control pulses is not appreciably different than the rise time of each of said first pulses, at least until said second pulse reaches said predetermined amplitude, the value of said inductance means being further selected so that each of said second pulses remains above said predetermined amplitude for a time interval greater than the duration of each of said first pulses.

2. The pulse control circuit according to claim 1, said pulse utilization device comprising transistor means having a base and an emitter, said input resistance means comprising the base-to-emitter resistance of said transistor means, said different conductive states being saturation and cutoff, said transistor means being cutoff when the amplitude of said second pulse is less than said predetermined amplitude to thereby cause said input resistance means to be relatively large so that the rise time of said second pulse is relatively fast until said second pulse reaches said predetermined amplitude, said transistor means being in saturation when the amplitude of said second pulse is greater than said predetermined amplitude to thereby cause said input resistance means to be relatively small so that said second pulse has a relatively slow rise time until said first pulse is removed, said relatively small input resistance means causing said second pulse to have a relatively slow fall time at least until said predetermined amplitude is reached, said relatively fast rise time and said relatively slow fall time causing said second pulse to be greater than said predetermined amplitude from a time not appreciably different than the time said first pulse commences until a predetermined time after the removal of said first pulse.

3. The pulse control circuit according to claim 1, said oscillator circuit comprising a transistor of a given conductivity type, said output resistance means comprising a load resistance for said transistor, said pulse utilization device comprising a transistor of an opposite conductivity type, said inductance means providing a direct current connection between said oscillator circuit and said pulse utilization device.

4. The pulse control circuit according to claim 2, said inductance means having a natural resonant frequency due to distributed capacity thereacross, said inductance means subject to oscillations therein at said frequency commencing at said predetermined time after the removal of said first pulse, resistance means connected in parallel with said inductance means to damp said oscillations.

5. In a transistor receiver deflection system which provides a deflection signal for sweeping a cathode ray beam having trace and retrace portions, a pulse control circuit including the combination of; an oscillator circuit having output resistance means for developing a series of first pulses of a given duration, a pulse utilization device having input resistance means adapted to be switched between different conductive states for controlling the sweep of said cathode ray beam, inductance means coupling said oscillator circuit to said pulse utilization device, a predetermined amplitude of said second pulse driving said pulse utilization device into one of said conductive states to initiate said retrace portion, said inductance means, said output resistance means and said input resistance means forming a time constant network, the value of said inductance means being selected so that in combination with said output resistance means and said input resistance means the rise time of each of said second pulses is such that said pulse utilization device is drive into said one conductive state in a relatively short time after the commencement of said first pulse and placed in the other of said conductive states a relatively long time after said first pulse is removed.

6. The pulse control circuit according to claim 5, a damping diode conductively coupled to said deflection circuit and poled so that it conducts during an initial part but not a subsequent part of said trace portion, said value being further selected so that said pulse utilization device in maintained in said one conductive state at least until the beginning of said initial part but not longer than the end of said initial part.

References Cited

UNITED STATES PATENTS

| | | | |
|---|---|---|---|
| 2,707,751 | 5/1955 | Hance | 328—58 |
| 2,519,802 | 8/1950 | Wallman | 328—32 |
| 3,149,288 | 9/1964 | Rhodes | 328—169 |
| 3,152,267 | 10/1964 | Clapper | 307—265 |
| 3,171,985 | 3/1965 | Freimanis | 307—267 XR |
| 3,206,614 | 9/1965 | Wright | 307—293 |

RODNEY D. BENNETT, Jr., Primary Examiner

JOSEPH G. BAXTER, Assistant Examiner

U.S. Cl. X.R.

307—267; 328—58